Figure 1:
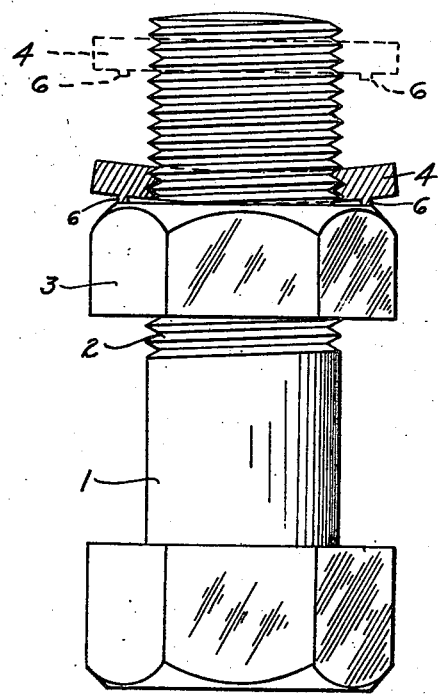

O. H. SLEEPER.
LOCK NUT.
APPLICATION FILED APR. 6, 1915.

1,159,283.

Patented Nov. 2, 1915.

WITNESSES
Jas C. Hamilton.
Jacob Rawlings,

INVENTOR
OTIS H. SLEEPER
BY
ATTORNEY

UNITED STATES PATENT OFFICE.

OTIS H. SLEEPER, OF EXETER, NEW HAMPSHIRE.

LOCK-NUT.

1,159,283.  Specification of Letters Patent.  Patented Nov. 2, 1915.

Application filed April 6, 1915. Serial No. 19,538.

*To all whom it may concern:*

Be it known that I, OTIS H. SLEEPER, a citizen of the United States, residing at Exeter, county of Rockingham, State of New Hampshire, have invented certain new and useful Improvements in Lock-Nuts, of which the following is a specification.

This invention relates to nut locks and particularly to a construction wherein the common nut is locked against movement on the bolt by a flexible locking member adapted to be threaded on the bolt and set tightly against the nut.

My present invention involves the use of an elastic locking member which is applied to the bolt above the common nut and is run down against the common nut in symmetrical transverse relation to the longitudinal axis of the bolt so that the locking member simultaneously contacts the common nut on two opposite sides of the bolt. This simultaneous contact produces an equal opposite distortional tendency which is both balanced and symmetrical so as to produce a balanced distortion in the opposed lateral areas of the locking member to cause the threads thereof to bend from their plane of normal angular pitch coinciding with the bolt threads to a plane of sinuous curvature wherein they interlockingly engage with the bolt threads.

Heretofore such lock nuts as have involved the use of an elastic threaded locking member have been open to the objection that the locking member has usually had an unsymmetrical and in most cases only a partial frictional engagement with the common nut. The effect of this unsymmetrical and unbalanced engagement has been to make the lock nut easily disengageable by vibration because of its exposed loose side which has no engagement with the common nut. Furthermore the action of the unbalanced nut is disastrous both to its own threads and to the threads of the bolt. When the unbalanced nut is set up on the bolt the tendency of that side which is closest to the common nut and which will engage the common nut when the lock nut is screwed down is an upward tendency and the tendency of the free opposite side of the lock nut is a downward tendency. This causes a prying effect upon the threads when the nut is set up and produces an unbalanced distortion because of the unbalanced pressures on the opposite sides of the nut. Where the threads of the unbalanced nut have been interrupted by notches as has been proposed heretofore, the effect has been to cut the bolt threads and to prevent any distortion of the threads of the lock nut.

The objections to the unbalanced lock nut are overcome in the present invention by a construction wherein the lock nut has two opposed bearing surfaces which simultaneously contact the common nut on two opposite sides of the bolt and which thereby produce an equal opposite balanced pressure effective to symmetrically distort the threads of the lock nut without cutting the threads of the bolt. This engagement is such that any unscrewing tendency of the common nut has an immediate tightening effect upon the lock nut.

The lock nut of the present invention structurally possesses merit in that it is capable of manufacture inexpensively in commercial quantities. This is made possible in the present invention by a construction of lock nut wherein the arched form essential to such a nut is secured in an otherwise flat nut by an arrangement of opposite depending ribs or bearings. The lock nut may therefore be punched from a flat bar of stock upon which the ribs have previously been formed.

A further feature of advantage present in the lock nut of this invention resides in the fact that a user can tell by simply feeling the nut with his fingers which side is the engaging side, and may therefore thread the lock nut on the bolt in the dark and without further examination. Where the lock nut has been a simple arched piece it was difficult to tell without looking whether the nut was being threaded on with its proper side toward the common nut.

The construction and operation together with the preferred form of manufacture will be more fully disclosed in the specification that follows.

In the drawings forming a part of that specification I have shown as an illustrative embodiment, a form of lock nut which has been found satisfactory in use and well adapted to the requirements of manufacture.

Figure 2:
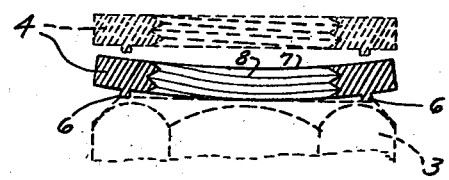
Figure 3:
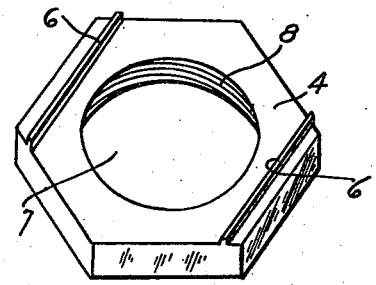
Figure 4:
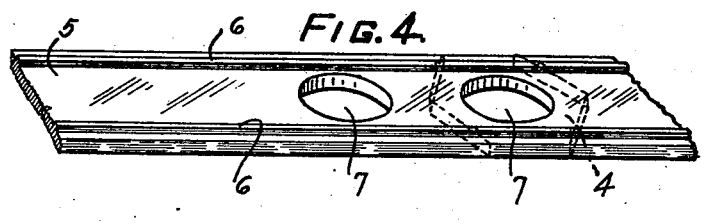
Figure 5:
Figure 6:
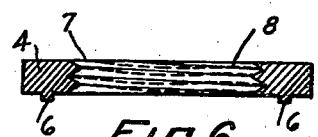

Througohut specification and drawings like reference numerals are applied to indicate corresponding parts and in these drawings:

Figure 1 is an elevation of nut and bolt showing my lock nut threaded thereto, the position and shape of the lock nut before tightening being indicated in dotted lines, and after tightening by the sectioned showing. Fig. 2 is a detail section of the lock nut indicating in full and dotted lines its two positions and particularly illustrating the thread deflection when the lock nut is tightened. Fig. 3 is an underneath perspective view of the lock nut. Fig. 4 is a perspective view of a length of stock illustrating the initial steps of manufacture. Fig. 5 is an exaggerated development of a thread of the lock nut, the full line 8ª indicating the normal projection of the thread before the nut is tightened, and the broken line 8ᵇ indicating the distortion of the thread after the nut is tightened, and Fig. 6 is a section of the lock nut indicating in full lines the thread development before the nut is tightened and in dotted lines the thread development after the threads have been distorted by the tightening of the nut.

I have indicated at 1 a bolt having a suitable thread 2 thereon, and at 3 a common nut threaded on said bolt.

The lock nut of the present invention consists of a flexible nut 4 adapted to be applied to the bolt and set up tightly against the nut 3 to prevent movement thereof on the bolt. The lock nut 4 is made of some spring metal which may be rolled and tempered in bar form as indicated at 5, Fig. 4 and has a pair of depending ribs 6 on opposite sides thereof at its under face. The ribs 6 provide opposite lateral bearings for the nut 4 on the nut 3 so as to afford a simultaneous contact on the nut 3 at two opposite sides of the bolt. This secures an arched locking member which may be drawn down centrally upon tightening. The lock nut may therefore be punched from a bar of perfectly flat stock on which the marginal longitudinal ribs have been previously formed, as shown in Fig. 4. In addition to providing this simultaneous contact and therefore an equal opposite distortional tendency in the adjacent lateral areas of the nut, the ribs 6 enable the user to immediately recognize the engaging side of the lock nut by the "feel" of the ribs. Where the lock nut has been a simple arched locking piece, it has been difficult, particularly where the nut is being applied in the dark to recognize which side of the locking piece was the under side, and must therefore be applied face down on the bolt.

The lock nut 4 has a truly axial bore 7 in which a thread 8 is tapped. The thread 8 is uninterrupted and continuous and the opening 7 being truly axial positions the lock nut on the bolt in symmetrical transverse relation to the longitudinal axis of the bolt so that the lock nut is balanced and symmetrical and the ribs 6 thereof simultaneously engage the common nut 3 with a balanced and symmetrical bearing on opposite sides thereof. The thread 8 of the lock nut 4 normally coincides with the thread 2 of the bolt 1. In the movement of the lock nut from the dotted line position shown in Fig. 1 to full line position, the lock nut runs on the bolt rapidly and freely due to the fact that the nut is a balanced nut. As the nut is tightened the ribs 6 simultaneously contact the top face of the common nut 3 on opposite sides thereof so that the setting pressure has the effect of flexing up the lateral areas of the nut from the center toward the outer edges beyond the ribs 6 as shown in full lines, Figs. 1 and 2.

The distortion of the threads 8 is symmetrical and balanced because the compressive tendency is symmetrical and balanced and is applied at two opposite points and in equal opposite lines of application. This prevents possibility of the thread 8 acting as a cutting die as it would if the engagement were not symmetrical as where the lock nut has a loose or non-engaging side or interrupted thread, and furthermore has the effect of resisting any unscrewing tendency on the part of the common nut due to vibration. Such unscrewing tendency simply causes an immediate and symmetrical tightening action of the lock nut on the threads of the bolt.

In Figs. 5 and 6 I have attempted to illustrate somewhat diagrammatically the thread distortion. In Fig. 5 the full straight line 8ª indicates the normal development of a single thread of the lock nut before the nut is set up on the bolt. In this position, the thread 8 coincides to the pitch of the bolt threads. Under the symmetrical and opposed action of the bearing surfaces 6 on the nut 3 as the lock nut contacts said nut 3 a distortional tendency in the lateral areas of the nut adjacent the edge 6 is produced and this tendency causes said areas to curve upwardly and away from the center of the nut. This upward tilting tendency of the opposed lateral areas of the nut produces a curving tendency upon the continuous and uninterrupted thread 8 of the nut and this curving tendency bends the threads into a plane of downward curving deflection relative to the undistorted threads of the bolt. This sinuous curvature of the threads 8 is indicated in Fig. 5 by the light broken line 8ᵇ which represents the distorted development of a single thread. In Fig. 6 I have sought to show this action in the lock nut itself. The full heavy lines indicate the normal pitch of the threads of the lock nut and the curved dotted lines indicate the deflection of the threads when the lock nut is set up.

In Fig. 4 I have illustrated a preferred method of manufacture. As explained, the lock nuts 4 are punched out of a length of suitable stock which has longitudinal ribs at each edge. The thread 8 is then tapped in the hole 7.

The lock nut of the present invention is therefore simple and inexpensive and can be manufactured in commercial quantities at a low cost. The arrangement of opposed bearing members produces precisely the same gripping effect as if the nut itself were of arched formation. The ribs 6 in addition permit the nuts to be blanked out of flat bar stock and also enables the user to tell by the mere feel of the nut whether or not he is applying it with the proper face toward the common nut.

Various modifications in the form and construction of my device may obviously be resorted to within the limits of the appended claims.

What I therefore claim and desire to secure by Letters Patent is:

1. A lock nut consisting of a flat sided flexible member of uniform thickness having a threaded bolt opening and having raised bearing ribs on opposite sides of said opening and disposed within the nut margin, said bearings having their contacting faces disposed in a plane at right angles to the axis of said opening and arranged for simultaneous balanced contact on opposite sides of the bolt to produce an equal opposite distortional tendency on the threads of the lock nut.

2. A lock nut consisting of a flexible flat faced member having a continuously threaded bolt opening and having parallel bearing ribs one on each side of said opening and having their bearing surfaces disposed in a plane at right angles to the axis of said opening, for simultaneous balanced contact on opposite sides of the bolt to produce an equal opposite distortional tendency on the threads of the lock nut.

3. A lock nut comprising a locking member having a substantially continuously threaded bore and having lateral bearings on opposite sides of one face thereof below the plane of the center of said face, said bearings adapted for simultaneous balanced contact on opposite sides of the bolt to produce an equal opposite distortional tendency on the threads of the lock nut effective to bend said threads to a plane of sinuous curvature in which they interlock with the bolt threads.

In testimony whereof I affix my signature in presence of two witnesses.

OTIS H. SLEEPER.

Witnesses:
VICTORIA LAWDEN,
MARION C. HOBBS.